United States Patent [19]
Benford et al.

[11] Patent Number: 5,462,500
[45] Date of Patent: Oct. 31, 1995

[54] AUTOMATIC TRANSMISSION WITH ADAPTIVE SHIFT SCHEDULE

[75] Inventors: Howard L. Benford, Bloomfield Hills; Maurice B. Leising, Clawson, both of Mich.

[73] Assignee: Chrysler Corporation, Highland Park, Mich.

[21] Appl. No.: 65,877

[22] Filed: May 21, 1993

[51] Int. Cl.$^6$ .................................................. B60K 41/10
[52] U.S. Cl. ................................................ 477/154
[58] Field of Search ................................. 477/154, 155

[56] References Cited

U.S. PATENT DOCUMENTS

| | | | |
|---|---|---|---|
| 3,927,579 | 12/1975 | Golan | 475/119 |
| 4,258,591 | 3/1981 | Eckert et al. | 477/125 |
| 4,523,281 | 6/1985 | Noda et al. | 364/424.1 |
| 4,608,873 | 9/1986 | Redzinski | 74/336 R |
| 4,638,690 | 1/1987 | Hattori et al. | 477/125 |
| 4,707,789 | 11/1987 | Downs et al. | 364/424.1 |
| 4,724,723 | 2/1988 | Lockhart et al. | 477/102 |
| 4,817,471 | 4/1989 | Tury | 477/125 |
| 4,938,102 | 7/1990 | Leising et al. | 477/154 |
| 5,123,301 | 6/1992 | Hagele et al. | 477/154 |
| 5,129,288 | 7/1992 | Sasaka et al. | 364/424.1 |
| 5,230,256 | 7/1993 | Oizumi et al. | 364/424.1 |
| 5,231,582 | 7/1993 | Takahashi et al. | 364/424.1 |
| 5,247,859 | 9/1993 | Agusa et al. | 364/424.1 |
| 5,337,239 | 9/1994 | Okuda | 364/424.1 |
| 5,341,703 | 8/1994 | Palansky et al. | 477/65 |

Primary Examiner—Dirk Wright
Attorney, Agent, or Firm—Mark P. Calcaterra

[57] ABSTRACT

The present invention provides a method of adaptively modifying the transmission shift schedule during various driving conditions. The method determines a desirable upshift schedule based upon driving conditions, and adaptively adjusts the transmission shift schedule in accordance with a predefined criteria. This is accomplished by observing vehicle speed and other transmission operating parameters and determining whether an adaptive shift schedule adjustment is required. If the shift schedule is adaptively adjusted, the driving parameters are further monitored to determine at which time the shift schedule may be reset to its initial state.

2 Claims, 2 Drawing Sheets

AUTOMATIC TRANSMISSION WITH ADAPTIVE SHIFT SCHEDULE

FIELD OF THE INVENTION

The present invention relates to an automatic transmission primarily intended for motor vehicle use, and more particularly to an "adaptive" transmission that is controlled electronically and hydraulically.

DESCRIPTION OF RELATED ART

In general, the major components featured in an automatic transmission are: a torque converter, fluid pressure-operated multi-plate drive or brake clutches and/or brake bands which are connected to individual elements of planetary gear sets in order to perform gear shifts without interrupting tractive power. The control system of the automatic transmission is typically hydraulically operated through the use of several valves to direct and regulate the supply of pressure. This hydraulic pressure control will cause either the actuation or deactuation of the respective clutches and/or bands for effecting gear changes in the transmission.

Recently, a more advanced form of transmission control system has been developed which enables the transmission to adapt itself to changing conditions. In this regard, U.S. Pat. No. 4,975,391, issued on Oct. 24, 1989 to Leising, et al., sets forth a fundamental development in this field. Specifically, this patent discloses an automatic transmission which features an "adaptive" control system that includes an electronic controller and electrically operated solenoid-actuated valves for controlling certain fluid pressure for effecting gear changes in the transmission.

In order to improve fuel economy of a motor vehicle equipped with such a transmission, it is desirable to reduce the speeds at which the transmission shifts between 3rd gear to 4th gear (3–4 shift). However, in order to prevent hunting between 3rd and 4th gear it is necessary to schedule a minimum amount of separation in speed between when the transmission will upshift from 3rd gear to 4th gear and downshift from 4th gear to 3rd gear. Further, to eliminate undesirable shift "feel" it is also necessary to inhibit certain downshifts for certain transmission speed ranges. Unfortunately, the combination of reducing the speed for the 3–4 shift and inhibiting certain downshifts can result in undesirable delays in 4–3 coast downshifts due to an inhibit condition being present. In other situations, an upshift schedule which produces the desired driving "feel" can seem too busy, i.e., the transmission making a number of upshifts and downshifts, as a result of small changes in throttle position.

SUMMARY OF THE INVENTION

It is therefore, one object of the present invention to provide lower 3–4 shift speeds while concomitantly eliminating undesirable delays in 4–3 coast downshifts due to downshift inhibit conditions for a transmission that is controlled electronically and hydraulically.

It is another object of the present invention to reduce transmission busyness for desired upshift schedules.

To achieve the foregoing objects, the present invention provides a method of adaptively modifying the transmission shift schedule during various driving conditions. The method determines a desirable upshift schedule based upon driving conditions, and adaptively adjusts the transmission shift schedule in accordance with a predefined criteria. This is accomplished by observing vehicle speed and other transmission and vehicle operating parameters and determining whether an adaptive shift schedule adjustment is required. If the shift schedule is adaptively adjusted, the driving parameters are further monitored to determine at which time the shift schedule may be reset to its initial state.

DETAILED DESCRIPTION OF THE INVENTION

The present invention is a method of adaptively scheduling shifts within an automatic transmission controlled electronically and hydraulically, and particularly for adaptively adjusting 3–4 shift and 4–3 shift schedules to improve fuel economy and eliminate undesirable coast downshift delays due to shift inhibit conditions. The method also provides for adaptively adjusting shift schedules for eliminating undesirable busyness. An automobile transmission (not shown, but see U.S. Pat. No. 4,875,391) is adapted for use in a vehicle such as an automobile. The transmission is controlled by a control system including an electronic controller (not shown, but see U.S. Pat. No. 4,875,391) and a plurality of solenoid-actuated valves (not shown, but see U.S. Pat. No. 4,875,391). Such a transmission and control system is disclosed in U.S. Pat. No. 4,875,391 to Leising, et al., the disclosure of which is hereby expressly incorporated herein by reference.

Figure 2:
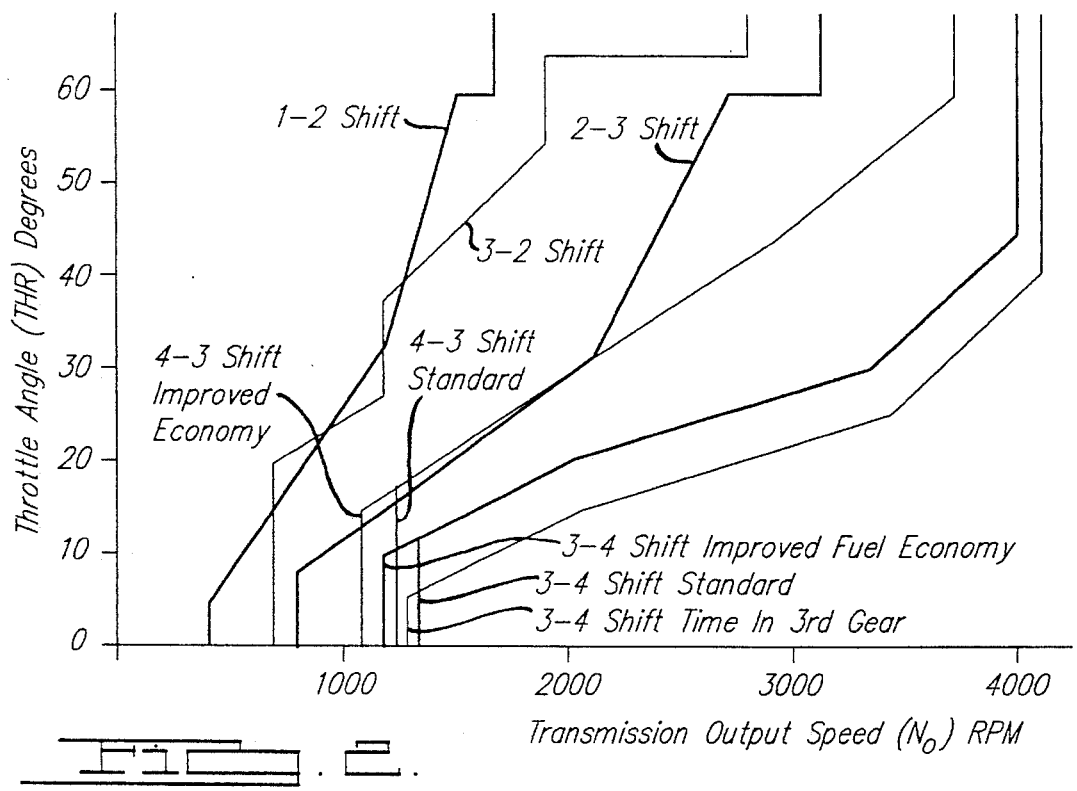
FIG. 2 is a graph illustrating a typical shift schedule for an electronically and hydraulically controlled automatic transmission and adaptively adjusted shift schedules for the method of the present invention.

One of the purposes of the present invention is to provide for a reduced 3–4 shift speed for improving vehicle fuel economy. Such a reduction in shift speed is illustrated in FIG. 2 by the lines labelled 3–4 Shift Improved Fuel Economy as compared to the lines labelled 3–4 Shift Standard. A reduction in the 3–4 shift speed, however, also results in a reduction in the 4–3 downshift speed illustrated in FIG. 2 as 4–3 Shift Improved Fuel Economy and 4–3 Shift Standard, respectively. The 4–3 shift speed is reduced due to the requirement that the 4–3 downshift speed not occur unless the transmission output speed is at least a minimum RPM value below the 3–4 shift speed for preventing undesirable hunting between 3rd and 4th gear.

A result of lowering the 4–3 downshift speed under various driving conditions, is an increased potential for undesirable delays in 4–3 coast downshifts due to downshift inhibit criteria. In order to improve downshift "feel" it is desirable to inhibit downshifts under certain driving conditions. Basically, a shift is inhibited if it would result in a positive to negative torque change between the vehicle engine and the transmission torque converter. During coast down and prior to downshift, the engine is supplying positive torque, i.e., resisting the reduction in speed of the transmission and therefore, the vehicle. Upon downshift, torque converter turbine speed is increased with little increase in engine speed as well as transmission output speed. In fact, the torque converter turbine speed goes from below engine speed to above engine speed under various downshift conditions. This change to above engine speed in torque converter turbine speed results in a change from positive torque to negative torque delivered through the torque converter turbine and the transmission, i.e., driving torque is delivered to the vehicle drivetrain. This change from positive to negative torque is taken up in the lash of the vehicle drivetrain components resulting in a "clunking" feel and sound to the downshift. Hence, it is desirable to inhibit downshifts under these conditions.

Figure 3:
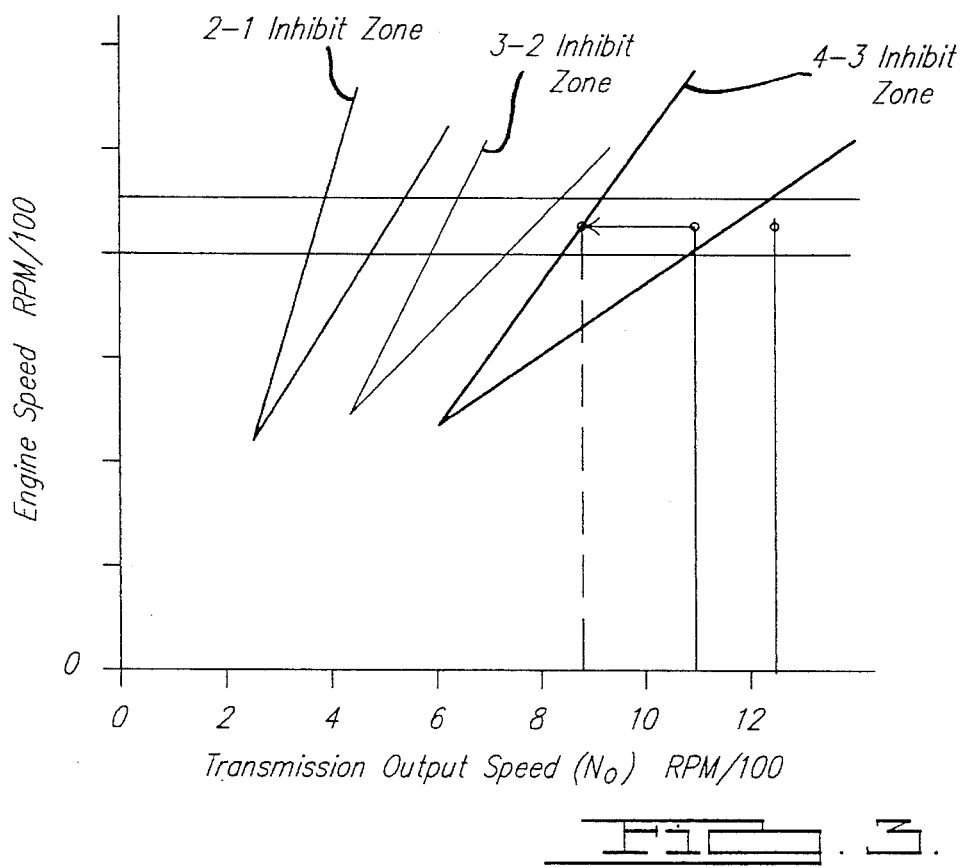
FIG. 3 is a graph illustrating typical downshift inhibit zones for an electronically and hydraulically controlled automatic transmission.

Illustrated in FIG. 3, are typical zones in which coasting downshifts are inhibited. To the right of the chart, the 4–3 downshift zone is shown and labeled 4–3 Inhibit Zone. The line drawn at a transmission output speed of about 1250 RPM represents the 4–3 downshift point for a coasting downshift under standard conditions. The line drawn at a transmission output speed of about 1100 RPM represents the 4–3 downshift point for a coasting downshift under the improved fuel economy shift schedule. As can be seen from the graph, under the improved fuel economy shift schedule and for typical engine speeds between 800 and 900 RPM, the 4–3 downshift is likely to be inhibited, and the downshift will not occur until transmission output speed is less than approximately 900 RPM. Delaying the 4–3 downshift results in undesirable driving characteristics including loss of expected performance after a coast downshift followed by a sudden acceleration.

Figure 1:
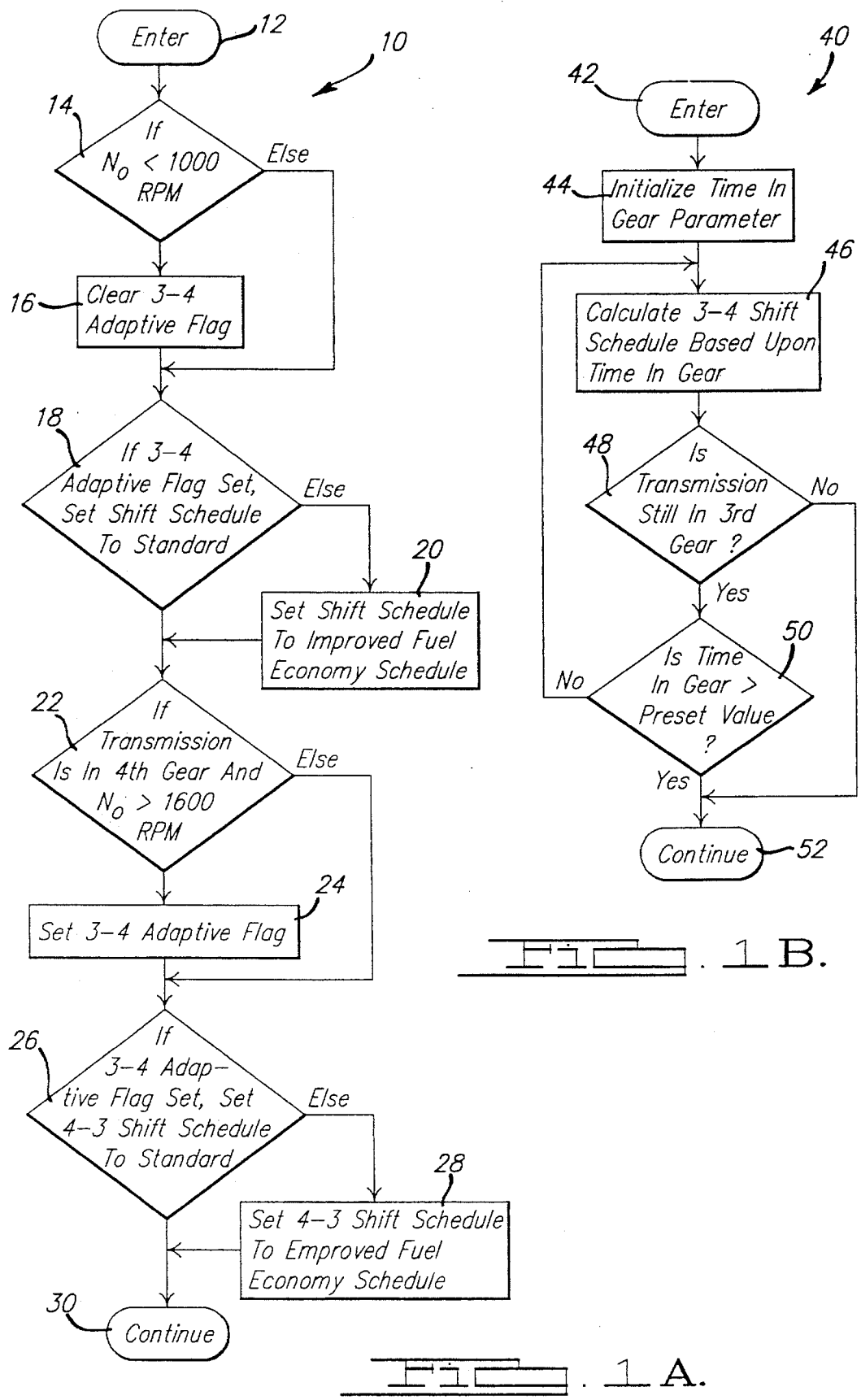
FIG. 1A is a flowchart for a method of adaptively adjusting a shift schedule according to the present invention.
FIG. 1B is a flowchart for the method of adaptively adjusting a shift schedule based upon time in gear according to the present invention.

With reference to FIG. 1, a flowchart 10 is shown for a method of adaptively scheduling 3–4 upshift and 4–3 downshift schedules. The methodology enters through bubble 12 and advances to diamond 14 and determines if the transmission output speed (No) is less than 1000 RPM. If transmission output speed is less than 1000 RPM, then a flag, the 3–4 adaptive flag within the transmission controller, is cleared at block 16. It should be appreciated that suitable sensors are used to measure this and other transmission and vehicle parameters and provide corresponding signals to the transmission controller.

The methodology continues to diamond 18 and if the 3–4 adaptive flag is set, the methodology sets the 3–4 shift schedule to the standard schedule. If the 3–4 adaptive flag is clear, then the methodology sets the 3–4 shift schedule to the improved fuel economy shift schedule, block 20.

Once in 4th gear, the methodology observes the status of the vehicle in 4th gear, and if during this period the transmission output exceeds 1600 RPM, diamond 22, the 3–4 adaptive flag is set, block 24. The methodology then continues to diamond 26, and if the 3–4 adaptive flag is set, the methodology sets the 4–3 downshift schedule to the standard schedule. If the 3–4 adaptive flag is clear, then the methodology sets the 4–3 downshift schedule to the improved fuel economy schedule, block 28.

In operation, if the vehicle accelerates through 3rd gear at a low rate, i.e., small throttle angles, the shift schedule is adaptively changed to provide improved fuel economy. When the vehicle arrives at 4th gear and increases in speed such that a sufficiently high transmission output speed is achieved, the shift schedule is set to the standard. Thus, upon deceleration, shifts will occur at higher transmission speed and 4–3 downshift inhibit will be avoided. It should be appreciated that the foregoing method may be further adapted to adaptively adjust other upshift/downshift schedules besides the 3–4, 4–3 shift schedule and for other purposes than for improving fuel economy or based upon other parameters besides transmission output speed.

The method of the present invention is also suited to adjust the 3–4 pattern based upon the amount of time the vehicle has been traveling in 3rd gear. With reference once again to FIG. 2, there is illustrated in addition to the previously discussed 3–4 Improved Fuel Economy shift schedule, the 2–3 Standard shift schedule. Upon acceleration at a low throttle angle, of for example 15 degrees, the 2–3 shift occurs at approximately a transmission output speed of 1100 RPM. A slight closing of the throttle at this point to approximately 10 degrees will result in a 3–4 shift according to the Improved Fuel Economy shift schedule. As will be appreciated, small changes in throttle angle at this point can potentially result in hunting or undesirable busyness to the transmission shifts, i.e., rapid shifts between gears.

The following equation relates throttle angle (THR) to transmission speed for the modified 3–4 shift schedule based upon time in 3rd gear:

$$THR < [f_{34} (N_o - 32 C_t) - 3 (0.527) C_t]$$

where $f_{34}$ is the function for the 3–4 shift schedule curve; $N_0$ is transmission output speed; $C_t$ is a time coefficient based upon time in 3rd gear; and 32 and 0.527 are scaling factors.

The modified 3–4 shift schedule based on time in third gear is illustrated graphically on FIG. 2 and is labeled 3–4 Shift Time In Third Gear. As can be seen from the modified 3–4 shift schedule, the 3–4 shift requires higher transmission output speeds and reduced throttle angles. Therefore, small changes in throttle position will not cause busy shifting at the 1100 RPM transmission output speed. The equation further provides for maintaining the modified shift schedule and then increasing the shift schedule back to standard as time in third increases, i.e., the coefficient $C_t$ increases.

With reference to FIG. 1B a flowchart 40 is shown for the method of adaptively scheduling 3–4 shifts based upon time in gear. The methodology enters at bubble 42 and proceeds to block 44 where a time in gear parameter is initialized upon the transmission shifting into a particular gear, in this example, 3rd gear. Upon entering the subject gear, the methodology calculates the adaptive shift schedule according to the equation above, block 46.

The methodology proceeds to diamond 48 to determine if the transmission is still in the subject gear, if it is not, then the method is exited. If the transmission is still in the subject gear, the time in that gear is checked and if the time in gear is below a preset value, block 50, then the methodology loops back and once again calculates the 3–4 adaptive shift schedule based upon the new time in gear. If the time in gear exceeds the preset value, then based upon the above equation, the 3–4 adaptive shift schedule has been reset to standard and the method is exited.

As can be appreciated, a shift schedule may be adaptively controlled based both on transmission output and based upon time in gear and for any shift schedule not just the 3–4 shift. It should also be understood that the present invention has been described in an illustrative manner. Therefore, the terminology which has been used is intended to be in the nature of words of description rather than limitation.

Many modifications and variations of the present invention are possible in light of the above teachings. Therefore, within the scope of the appended claims, the present invention may be practiced otherwise that as specifically described.

What is claimed is:

1. In a transmission system associated with an engine, the transmission system including an input member, an output member, a gear assembly for changing the ratio of torque between the input member and the output member, input sensors providing input signals indicative of predetermined conditions, a controller having memory for processing and storing the input signals and providing output signals to shift the gear assembly, a method of adaptively scheduling upshifts and downshifts of the gear assembly, said method comprising the steps of:

checking a time the transmission has remained in a particular gear;

shifting the gear assembly according to a first shift schedule when the time corresponds to a preset criteria;

rechecking the time the transmission has remained in a particular gear;

shifting the gear assembly according to a second shift schedule when said time corresponds to a second preset condition.

2. In an automatic transmission, a method for adaptively scheduling upshifts and downshifts, said method comprising the steps of:

determining the transmission output speed;

clearing a flag when the transmission output speed corresponds to a predefined criteria;

scheduling upshifts based upon a first shift schedule if the flag is cleared, else scheduling upshifts based upon a second shift schedule;

redetermining the transmission output speed;

determining a gear the transmission is currently in;

setting the flag when the transmission output speed corresponds to a second predefined criteria and the transmission is in a predefined gear; and scheduling downshifts according to the second shift schedule when the flag is set, else scheduling downshifts according to the first shift schedule.

* * * * *